United States Patent
Hassel

(10) Patent No.: US 9,276,448 B2
(45) Date of Patent: Mar. 1, 2016

(54) CONDITION MONITORING SYSTEM FOR A MOTOR

(75) Inventor: Jörg Hassel, Erlangen (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 460 days.

(21) Appl. No.: 13/515,119

(22) PCT Filed: Dec. 10, 2009

(86) PCT No.: PCT/EP2009/066797
§ 371 (c)(1),
(2), (4) Date: Jun. 11, 2012

(87) PCT Pub. No.: WO2011/069543
PCT Pub. Date: Jun. 16, 2011

(65) Prior Publication Data
US 2012/0267988 A1   Oct. 25, 2012

(51) Int. Cl.
*H02K 11/00* (2006.01)
*G01D 11/24* (2006.01)
*H02K 5/22* (2006.01)

(52) U.S. Cl.
CPC ............... *H02K 5/225* (2013.01); *G01D 11/24* (2013.01); *H02K 11/0078* (2013.01)

(58) Field of Classification Search
CPC .... G01D 11/24; H02K 11/0078; H02K 5/225
USPC .......................... 310/68 B; 318/490; 388/909
See application file for complete search history.

(56) References Cited

U.S. PATENT DOCUMENTS

| | | | |
|---|---|---|---|
| 5,554,900 A * | 9/1996 | Pop, Sr. ................. 310/156.61 |
| 5,987,060 A * | 11/1999 | Grenon et al. ............... 375/213 |
| 6,107,621 A * | 8/2000 | Imai .................. C01D 5/34707 |
| | | | 250/231.13 |
| 6,124,692 A | 9/2000 | Canada |
| 6,198,183 B1 | 3/2001 | Baeumel et al. |
| 6,252,394 B1 * | 6/2001 | Roze ...................... F16C 17/08 |
| | | | 324/207.12 |
| 6,449,567 B1 * | 9/2002 | Desai et al. ..................... 702/58 |
| 6,839,660 B2 * | 1/2005 | Eryurek et al. ............... 702/188 |
| 6,930,490 B2 * | 8/2005 | Saunders et al. ............. 324/511 |
| 7,135,830 B2 * | 11/2006 | El-Ibiary ....................... 318/561 |
| 7,142,990 B2 * | 11/2006 | Bouse et al. ..................... 702/35 |
| 2004/0015383 A1 | 1/2004 | Rathjen et al. |

(Continued)

FOREIGN PATENT DOCUMENTS

| DE | 10339017 | 4/2005 |
|---|---|---|
| JP | 59-099662 | 6/1984 |

(Continued)

OTHER PUBLICATIONS

Translation of Foreign Document JP 2003185056 A (Year: 2003).*

(Continued)

*Primary Examiner* — Alex W Mok
(74) *Attorney, Agent, or Firm* — Staas & Halsey LLP

(57) ABSTRACT

In order to enable simple, low-cost monitoring of a motor, a switch box cover for the motor, a condition monitoring system has a sensor unit for detecting a measured variable of the motor, a communication device, which is designed to provide a characteristic value that characterizes the measured variable to a reading device, and a supply unit for supplying the sensor unit with energy.

16 Claims, 1 Drawing Sheet

(56) References Cited

U.S. PATENT DOCUMENTS

| | | |
|---|---|---|
| 2005/0067991 A1* | 3/2005 | El-Ibiary .................. 318/490 |
| 2006/0022555 A1* | 2/2006 | Balasubramaniam et al. ........................ 310/339 |
| 2007/0075595 A1* | 4/2007 | Narayanan et al. ............ 310/52 |
| 2007/0139056 A1 | 6/2007 | Kaneiwa et al. |
| 2007/0296309 A1* | 12/2007 | Younsi et al. ................ 310/338 |
| 2008/0129138 A1* | 6/2008 | Pizzichil .................... 310/179 |
| 2009/0284104 A1* | 11/2009 | Knorr et al. ................ 310/68 B |
| 2010/0085002 A1 | 4/2010 | Knauff |

FOREIGN PATENT DOCUMENTS

| | | |
|---|---|---|
| JP | 4-210752 | 7/1992 |
| JP | 11-346454 | 12/1999 |
| JP | 2000-155053 | 6/2000 |
| JP | 2003185056 A * | 7/2003 ............. F16K 37/00 |
| JP | 2004-522213 | 7/2004 |
| JP | 2006-64461 | 3/2006 |
| JP | 2006-94576 | 4/2006 |
| JP | 2009-197961 | 9/2009 |
| JP | 2009-544267 | 12/2009 |
| WO | 2008/009554 | 1/2008 |
| WO | PCT/EP2009/066797 | 12/2009 |

OTHER PUBLICATIONS

Notice of Allowance mailed Jul. 15, 2014 for corresponding Japanese Patent Application No. 2012-542366.
Japanese Office Action for Related Japanese Patent Application No. 2012-542336, mailed Dec. 24, 2013, 7 pages.
International Search Report for PCT/EP2009/066797, mailed on Sep. 22, 2010.

* cited by examiner

CONDITION MONITORING SYSTEM FOR A MOTOR

CROSS REFERENCE TO RELATED APPLICATIONS

This application is based on and hereby claims priority to International Application No. PCT/EP2009/066797 filed on Dec. 10, 2009, the contents of which are hereby incorporated by reference.

BACKGROUND

The invention relates to a condition monitoring system for a motor.

As a rule, the fitting of condition monitoring functions to a system, and in particular to a motor, is associated with laborious installation effort. Particularly when fitting condition monitoring functions to a motor retrospectively, very laborious and possibly structural measures are usually required. The sensors required for monitoring must be positioned on and attached to the motor. Further, the sensors must be cabled to their responsible controller. Exposed cables in the working area must be laid on trays or via underfloor cable channels in order to avoid hazards to people and machines in the working area. As a result of the additional installation of sensors and the additional laying of cables, it may be necessary to reassess the safety of a system.

In the case of retrospective fitting, the sensors required for the condition monitoring function are usually fitted to the motor retrospectively as individual functions with a great deal of effort. Retrospective fitting of this kind therefore requires considerable installation effort and parameterizing effort. A highly specialized installer is usually required for this purpose.

SUMMARY

It is therefore one possible object to enable a motor to be monitored simply and cost-effectively.

The inventor proposes for condition monitoring functions for the motor, in particular an electric motor, to be performed with a terminal box cover. The components required for the condition monitoring function are integrated in the terminal box cover. To enable the terminal box cover to monitor the condition of the motor, the terminal box cover includes at least one sensor unit which is designed to record a measured variable of the motor. Further, the terminal box cover includes a communications device, which is designed to make at least one parameter that characterizes the measured variable available to a reading device. A supply unit of the terminal box cover serves to supply the sensor unit and preferably also the communications device with energy.

The terminal box cover consequently forms an independent monitoring unit which enables the motor to be monitored. An advantage of the terminal box cover with integral condition monitoring function is that no laborious cabling between the sensors and the communications unit is required, as this is already implemented within the terminal box cover. The installation effort for laying the cables of conventional condition monitoring sensors can therefore be completely dispensed with.

A further advantage of the motor monitoring by the terminal box cover is that this enables simple retrospective fitting for an end user. By the terminal box cover with integral condition monitoring functionality, an end user can equip his existing system and in particular the existing motor with condition monitoring functions in a simple, uncomplicated manner. All that is necessary for this is to replace the terminal box cover of a terminal box of the existing motor with the proposed terminal box cover. Elaborate installation and cabling to the motor are not necessary.

With appropriate sensors, the required measured variables and consequently parameters of the motor can be recorded by the sensor unit of the terminal box cover. These measured variables, and in particular the parameter that characterizes the measured variable, can be made available to the reading device via the communications device. In this regard, the reading device is preferably arranged outside the motor. The motor can therefore be continuously monitored by the decentral reading device. With appropriate design of the reading device and of the communications device, an online monitoring of the motor is likewise possible. In this way, the condition of the motor and consequently of the system can be monitored independently of location.

Condition monitoring functions enable possible problems with the motor to be detected at an early stage so that an end user can take the appropriate precautionary measures in a timely manner. Further, the running time of the motor can be extended by fitting a motor with condition monitoring functions, as ultimately the attention of the end user is drawn to a defect of the motor in a timely manner and he therefore does not have to replace a motor for purely precautionary reasons as is usually the case.

In an advantageous embodiment, the supply unit is provided for supplying the communications device with energy.

As a result of this, the terminal box cover forms an inherently closed unit which can be used independently. Preferably, the supply unit is designed to supply the communications device and/or the sensor unit completely with energy. Consequently, no further wiring is required with regard to the sensor unit and/or the communications device. In particular, this simplifies the manufacture of a motor with a terminal box which has the proposed terminal box cover, as well as the retrospective fitting of an existing motor with the proposed terminal box cover which has condition monitoring functions. An end user can therefore equip or retrofit his system, and in particular the motors, with a monitoring function in a simple manner. In the case of retrospective fitting, all that he has to do is to replace a terminal box cover of the existing motor by the proposed terminal box cover belonging to the motor. The terminal box cover can preferably have different condition monitoring functions depending on the customer's requirement.

In a further advantageous embodiment, the terminal box cover makes the electronic rating plate of the motor available via the communications device.

This enables the most important characteristic data of the motor to be made available to a reading device. It is particularly advantageous when the electronic rating plate of the motor is likewise stored in the terminal box cover. Further motor-specific analyses can be carried out based on the information of the electronic rating plate. Further, an end user can easily call up the motor-related data via the communications device and use them for pending analyses, for example.

In a further advantageous embodiment, the sensor unit performs partial discharge measurement.

With the partial discharge measurement, a measured variable or a plurality of measured variables which identifies/identify the presence of a partial discharge is/are recorded by the sensor unit. A parameter that characterizes the measured variable(s) is ultimately made available to a reading device with the help of the communications device. Thanks to the availability of this information, an end user who receives information of this kind via the reading device can respond accordingly and initiate the necessary measures. It is likewise possible for an evaluation unit which has a reading device for reading the parameters of the communications device to automatically initiate the necessary measures.

In a further advantageous embodiment, the sensor unit has a device to measure a temperature of the motor, in particular of a stator winding, and/or an ambient temperature of the motor.

The temperature and the ambient temperature of the motor can therefore be determined with the help of the sensor unit. These temperatures, or a parameter which characterizes this/these temperature(s), can be made available to a reading device via the communications device for further analysis.

In a further advantageous embodiment, the sensor unit has a device to measure an out-of-balance of the motor.

An out-of-balance of the motor can be determined, for example, by analyzing low frequency bands. Consequently, the device for measuring an out-of-balance of the motor is preferably designed to analyze low frequency bands.

In a further advantageous embodiment, in order to form the parameter, the sensor unit has at least one sensor for determining a measured variable and a reference value of the motor for comparison with the determined measured variable of the sensor.

The reference value is preferably stored in a memory of the terminal box cover. As both the reference value of the motor and the determined measured variable are available to the terminal box cover, the present condition can be evaluated by comparing the two values with one another.

Depending on the application scenario, the terminal box cover, and in particular its sensor unit, can consequently be provided with special sensors which are capable of determining different measured variables of the motor, so that the present condition of the motor can be determined by comparing the determined measured variables with the respective reference values of the motor. A determination of this kind can take place either in the terminal box cover itself or in a downstream process. In the case of the downstream process, the parameter or the parameters is/are called up from the communications device by a reading device and subsequently analyzed.

In a further advantageous embodiment, the sensor unit has a device to analyze the measured variables among one another.

Based on such an analysis of the individual measured variables among one another, a more varied analysis can be carried out immediately within the terminal box cover. Preferably, both the reference variables and the information of the electronic rating plate are included in the analysis. An analysis of this kind enables better conclusions to be drawn relating to the present condition of the motor. An analysis of the individual measured variables among themselves and/or associated reference variables can consequently lead to a single parameter that characterizes the measured variables. Based on this parameter, it can consequently be determined whether or not the motor is in a proper condition. This enables the necessary complexity of the communications with a reading device to be minimized.

In a further advantageous embodiment, the sensor unit has a processor for determining the parameter.

Integrating the processor into the terminal box cover enables complex analyses of the individual measured variables to be carried out among one another or with associated reference variables. Further, integrating the processor and preferably a memory into the terminal box cover enables the terminal box cover to be retrospectively augmented by further functional evaluations. Likewise, moving the functional evaluation to the terminal box cover enables the parameters to be transmitted to be pre-selected. Consequently, a communication between the communications device and the reading device can be reduced. Likewise, as a result of the analysis being already carried out in the terminal box cover, a requirement for additionally necessary components in addition to the terminal box cover is minimized, as ultimately the whole condition monitoring function of the motor, including the analysis, is realized by the terminal box cover.

Consequently, the determined measured variables of the sensor unit can be analyzed based on evaluation logic stored in the processor, and a measured variable which reflects the health of the motor can be formed therefrom. This measured variable can be made available to a reading device by its associated characterizing parameter.

In a further advantageous embodiment, the communications device is provided for communication with an external reading device.

Consequently, communication is carried out with a decentral reading device which is located outside the motor. Communication with the external reading device can be wired or preferably wireless. An end user can call up available parameters or measured variables of the motor using a handheld device and use them for further analysis. The advantage of wireless communication between the communications device and the reading device is that the installation effort is reduced to a minimum. Consequently, all that an end user has to do is to replace the terminal box cover of the existing motor by a terminal box cover. It is not necessary to lay any cables. The terminal box cover is consequently an independent unit and can preferably be fitted to the motor in place of the existing terminal box cover without any repercussions.

Preferably, the determined measured variables and/or parameters are stored in a memory of the terminal box cover so that an analysis of the measured variables or parameters can be carried out over time.

In a further advantageous embodiment, the supply unit has a device for coupling energy from the motor connecting cable.

A coupling of energy from the motor connecting cable of this kind can be carried out, for example, by magnetic energy coupling, capacitive energy coupling or resistive energy coupling (e.g. via a transformer).

In a further advantageous embodiment, the supply unit obtains energy by energy harvesting.

When obtaining energy by energy harvesting, electricity is generated from sources such as the ambient temperature, vibrations or air flow, for example.

In a further embodiment, a terminal box of a motor has the proposed terminal box cover.

In a further embodiment, a motor has a terminal box with the proposed terminal box cover.

In a further advantageous embodiment, the sensor unit, the communications device and the supply unit are mounted on a printed circuit board of the terminal box cover.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
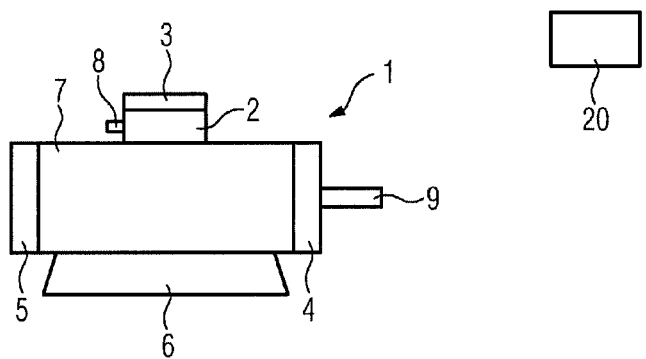
FIG. 1 shows a schematic diagram of an electric motor 1.

Reference will now be made in detail to the preferred embodiments of the present invention, examples of which are illustrated in the accompanying drawings, wherein like reference numerals refer to like elements throughout.

FIG. 1 shows a schematic diagram of an electric motor 1. The electric motor 1 is fixed on a supporting stand 6. The electric motor 1 comprises a shaft 9, a drive-end motor end shield 4 and a non-drive-end motor end shield 5 which encompasses the machine housing of the electric motor 7. The motor end shields 4, 5 form the rear and front covers of the machine housing 7. The interior of the machine is protected against contact by the motor end shields 4, 5, which accommodate the bearings of the shaft 9. The drive-end motor end shield 4 designates the drive end and, as a rule, carries a fixed bearing. The non-drive-end motor end shield 5 is the "fan shield" and the bearing normally has a sliding fit. Further, the electric motor 1 has a terminal box 2. This terminal box 2 is securely connected to the electric motor 1. The motor connecting cable can be connected to the electric motor 1 via a connection opening 8 of the terminal box 2 in order to supply energy. The terminal box 2 has a terminal box cover 3. This terminal box cover 3 is mechanically connected to the terminal box 2 with the help of fixing elements.

To enable the condition of the electric motor 1 to be monitored, the terminal box cover 3 has a sensor unit for recording a plurality of measured variables of the electric motor 1. A communications device, which is integrated in the terminal box cover 3, is designed to make a parameter that characterizes the respective measured variable and/or one of the measured variables available to a reading device 20. Here, communication between the communications device and the reading device 20 is wireless so that no cabling is necessary for the condition monitoring. Further, the terminal box cover 3 comprises a supply unit to supply the sensor unit and the communications device with energy. The terminal box cover 3 therefore forms a condition monitoring system for the electric motor 1.

The advantage of a condition monitoring system of this kind for an electric motor 1 is that no elaborate installation (cabling, parameterizing, etc.) is required. Further, there is no safety-critical laying of exposed cables, as everything is already integrated in the terminal box cover 3. A further major advantage is that retrospective fitting of a conventional electric motor with condition monitoring functions is made possible merely by replacing the terminal box cover with a terminal box cover 3 which includes the condition monitoring functionality. This is an enormous advantage for an end user.

Figure 2:
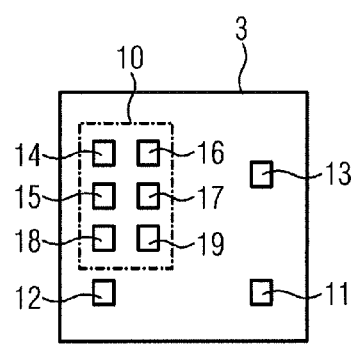
FIG. 2 shows a schematic diagram of a side of the terminal box cover 3 from FIG. 1 which faces the terminal box 2 in the fitted state.

FIG. 2 shows a schematic diagram of a side of the terminal box cover 3 from FIG. 1 which faces the terminal box 2 in the fitted state. This terminal box cover 3 comprises a sensor unit 10, a supply unit 12, a communications device 11 and a device 13 for making the electronic rating plate available. The supply unit 12 supplies the sensor unit 10, the communications device 11 and the device 13 for making the electronic rating plate available with electrical energy. Here, the energy is obtained by coupling energy from the motor connecting cable. Alternatively or in addition, the supply to the respective components can likewise be guaranteed by energy harvesting measures. Further, the sensor unit 10 comprises a means 14 for partial discharge measurement, a means 15 for measuring a temperature of a stator winding of the electric motor and/or an ambient temperature of the electric motor, a means 16 for measuring an out-of-balance of the electric motor, a processor 17 and a memory 19 for storing the reference value of the electric motor and/or the determined measured variables or parameters. The terminal box cover 3 has suitable sensors 18 for determining the required measured values.

As, furthermore, the terminal box cover 3 has reference values of the electric motor and a processor 17 and a memory 19, condition monitoring can be carried out by the terminal box cover 3. In doing so, the condition monitoring has a plurality of sub-steps. First of all, the condition is determined. In this regard, measured variables/machine parameters of the electric motor are measured by sensors of the sensor unit 10. The actual condition of the electric motor is compared with a specified reference value by a state comparison. This reference value can be a setpoint to be maintained as well as a limit value of the electric motor which is not to be exceeded. The respective reference value and consequently the respective setpoint is determined either on machine acceptance or by specified variables depending on the parameter under investigation. Reference values of this kind are preferably already available in the electronic rating plate of the respective electric motor. Diagnosis of the determined measured value with the reference value is carried out in a next step. This is undertaken by a processor 17 which is mounted in the terminal box cover 3. If the analysis is carried out in the terminal box cover 3, a parameter that characterizes the measured variable is made available to the reading device via the communications device. This parameter signals whether or not a setpoint has been exceeded. Further, any deviation of the measured variable compared with the reference variable can be indicated based on the parameter. If a subsequent analysis of the determined measured variables is carried out, then the parameter that characterizes the measured variable can likewise merely be a value which represents the measured variable.

Further, the integration of a memory 19 enables the history of the electric motor to be examined and analyzed in more detail. The history of the measured variables and/or parameters of the electric motor, for example, can be read out via the communications device 11 and analyzed by the external reading device. Further, an analysis of this kind can likewise be carried out within the terminal box cover 3 with the help of the processor 17.

Integrating the processor 17 enables the electric motor to be monitored continuously and the machine parameters recorded in real time. In this way, long-term trends as well as sudden or transient changes in condition can be recorded and continuously commented.

The terminal box cover 3 enables an end user to easily fit a condition monitoring system with regard to the electric motor in his system retrospectively without elaborate cabling effort. He can therefore monitor the reliability of his system and his electric motor and consequently prolong the use of the electric motor. Unexpected machine failures can consequently be avoided. Further, the terminal box cover 3 enables the electric motor to be continuously checked both online and offline. A further advantage is that the terminal box cover 3 forms an independent unit and can therefore be fitted retrospectively in an already installed electric motor without major effort.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in Superguide v. DIRECTV, 69 USPQ2d 1865 (Fed. Cir. 2004).

The invention claimed is:

1. A terminal box cover for a motor, comprising:
   a sensor unit to record a measured variable for a condition of the motor, the measured variable including at least one of a temperature of the motor, a temperature of a stator winding of the motor, and an out-of-balance condition of the motor;
   a communications device to transmit to a reading device a parameter that characterizes the measured variable available; and
   a supply unit to supply energy to the sensor unit, the supply unit being supplied with energy from an energy source that is external to the terminal box cover, wherein
   all components of at least the sensor unit and the communications device are provided completely within the terminal box cover, which fits on and covers a terminal box,
   the terminal box is fixed to the motor, and
   the terminal box cover forms a self-sufficient monitoring unit for monitoring the condition of the motor.

2. The terminal box cover as claimed in claim 1, wherein the supply unit also supplies energy to the communications device.

3. The terminal box cover as claimed in claim 1, wherein the motor has an electronic rating plate storing characteristic data of the motor, and
   the communication device communicates with the electronic rating plate of the motor and transmits the characteristic data to the reading device.

4. The terminal box cover as claimed in claim 1, wherein the sensor unit performs a partial discharge measurement.

5. The terminal box cover as claimed in claim 1, wherein the sensor unit has at least one sensor to determine the measured variable, and
   the sensor unit compares the measured variable with a reference value of the motor to determine the parameter.

6. The terminal box cover as claimed in claim 5, wherein the motor has an electronic rating plate, and
   the communication device communicates with the electronic rating plate of the motor to obtain the reference value.

7. The terminal box cover as claimed in claim 1, wherein the sensor unit analyzes a plurality of measured variables with one another.

8. The terminal box cover as claimed in claim 1, wherein the sensor unit has a processor to determine the parameter.

9. The terminal box cover as claimed in claim 1, wherein the reading device is an external, remote reading device, and
   the communications device communicates with the external, remote reading device.

10. The terminal box cover as claimed in claim 1, wherein the supply unit couples energy from a motor connecting cable.

11. The terminal box cover as claimed in claim 1, wherein the supply unit obtains energy by energy harvesting.

12. A terminal box of a motor, comprising:
    a terminal box base, the terminal box base being fixed to the motor; and
    a terminal box cover to fit on and cover the terminal box base, the terminal box cover comprising:
      a sensor unit to record a measured variable for a condition of the motor, the measured variable including at least one of a temperature of the motor, a temperature of a stator winding of the motor, and an out-of-balance condition of the motor;
      a communications device to transmit to a reading device a parameter that characterizes the measured variable available; and
      a supply unit to supply energy to the sensor unit, the supply unit being supplied with energy from an energy source that is external to the terminal box cover, wherein
    all components of at least the sensor unit and the communications device are provided completely within the terminal box cover such that the terminal box cover forms a self-sufficient monitoring unit for monitoring the condition of the motor.

13. A motor comprising:
    a motor drive having terminals; and
    a terminal box, comprising:
      a terminal box base, the terminal box base being fixed to the motor drive; and
      a terminal box cover to fit on and cover the terminal box base, the terminal box cover comprising:
        a sensor unit to record a measured variable for a condition of the motor, the measured variable including at least one of a temperature of the motor, a temperature of a stator winding of the motor, and an out-of-balance condition of the motor;
        a communications device to transmit to a reading device a parameter that characterizes the measured variable available; and
        a supply unit to supply energy to the sensor unit, the supply unit being supplied with energy from an energy source that is external to the terminal box cover, wherein
    all components of at least the sensor unit and the communications device are provided completely within the terminal box cover such that the terminal box cover forms a self-sufficient monitoring unit for monitoring the condition of the motor.

14. A terminal box cover for a motor, comprising:
    a sensor unit to record a measured variable for a condition of the motor, the measured variable including at least one of a temperature of the motor, a temperature of a stator winding of the motor, and an out-of-balance condition of the motor;
    a wireless communications device to transmit a parameter that characterizes the measured variable, the parameter being transmitted to a remote reading device; and
    a supply unit to supply the sensor unit with electrical energy, the supply unit being supplied with energy from an energy source that is external to the terminal box cover, wherein
    the supply unit converts environmental energy into electrical energy without a hardwired connection to an electric energy source,
    all components of at least the sensor unit and the communications device are provided completely within the terminal box cover, which fits on and covers a terminal box,
    the terminal box is fixed to the motor, and
    the terminal box cover forms a self-sufficient monitoring unit for monitoring the condition of the motor.

15. The terminal box cover as claimed in claim 14, wherein the motor is externally connected via terminals within the terminal box.

16. The terminal box cover as claimed in claim 14, wherein the supply unit obtains electrical energy by converting energy from a heat source, a vibration source or an air flow source.

* * * * *